United States Patent
Asahi et al.

(10) Patent No.: US 10,120,235 B2
(45) Date of Patent: Nov. 6, 2018

(54) LIQUID CRYSTAL DISPLAY DEVICE

(71) Applicant: EIZO Corporation, Ishikawa (JP)

(72) Inventors: Keita Asahi, Ishikawa (JP); Mitsuhiro Takabatake, Ishikawa (JP); Takashi Murata, Ishikawa (JP)

(73) Assignee: EIZO Corporation, Ishikawa (JP)

(*) Notice: Subject to any disclaimer, the term of this patent is extended or adjusted under 35 U.S.C. 154(b) by 0 days.

(21) Appl. No.: 15/315,801

(22) PCT Filed: Jun. 2, 2014

(86) PCT No.: PCT/JP2014/064602
§ 371 (c)(1),
(2) Date: Dec. 2, 2016

(87) PCT Pub. No.: WO2015/186171
PCT Pub. Date: Dec. 10, 2015

(65) Prior Publication Data
US 2017/0090225 A1    Mar. 30, 2017

(51) Int. Cl.
G09G 3/20 (2006.01)
G09G 3/34 (2006.01)
G02F 1/13357 (2006.01)
G09G 3/36 (2006.01)

(52) U.S. Cl.
CPC ............. *G02F 1/1336* (2013.01); *G09G 3/36* (2013.01); *G09G 3/342* (2013.01); *G09G 2310/024* (2013.01); *G09G 2310/0237* (2013.01); *G09G 2310/08* (2013.01); *G09G 2320/0247* (2013.01); *G09G 2320/064* (2013.01)

(58) Field of Classification Search
None
See application file for complete search history.

(56) References Cited

U.S. PATENT DOCUMENTS

| | | |
|---|---|---|
| 7,133,015 B1 | 11/2006 | Yoshida et al. |
| 2002/0057238 A1 | 5/2002 | Nitta et al. |
| 2003/0122771 A1 | 7/2003 | Sumiyoshi et al. |
| 2006/0139289 A1 | 6/2006 | Yoshida et al. |
| 2006/0209000 A1 | 9/2006 | Sumiyoshi et al. |
| 2006/0279523 A1 | 12/2006 | Nitta et al. |

(Continued)

FOREIGN PATENT DOCUMENTS

| | | |
|---|---|---|
| JP | 2001-184034 A | 7/2001 |
| JP | 2002-156950 A | 5/2002 |

(Continued)

OTHER PUBLICATIONS

International Search Report dated Aug. 19, 2014 in corresponding Application No. PCT/JP2014/064602; 2 pgs.

(Continued)

*Primary Examiner* — Dedei K Hammond
(74) *Attorney, Agent, or Firm* — Maier & Maier, PLLC (57) ABSTRACT

Provided is a liquid crystal display device that can further reduce flicker. The liquid crystal display device includes a control unit that controls the luminance of a backlight using PWM dimming. The backlight includes n (n≥4) number of backlight blocks that are turned on at different timings, and the n number of backlight blocks are turned on in an order different from the order in which the backlight blocks are physically arranged.

13 Claims, 5 Drawing Sheets

(56) References Cited

U.S. PATENT DOCUMENTS

| | | | |
|---|---|---|---|
| 2007/0268238 A1* | 11/2007 | Chang | G09G 3/342 |
| | | | 345/102 |
| 2008/0259099 A1 | 10/2008 | Arai et al. | |
| 2009/0251641 A1 | 10/2009 | Sumiyoshi et al. | |
| 2010/0220047 A1* | 9/2010 | Adachi | G02F 1/133603 |
| | | | 345/102 |
| 2010/0225633 A1 | 9/2010 | Yoshida et al. | |
| 2010/0225681 A1 | 9/2010 | Yoshida et al. | |
| 2013/0088534 A1 | 4/2013 | Arai et al. | |
| 2014/0125573 A1 | 5/2014 | Sumiyoshi et al. | |
| 2016/0148584 A1 | 5/2016 | Arai et al. | |

FOREIGN PATENT DOCUMENTS

| | | |
|---|---|---|
| JP | 2003-131224 A | 5/2003 |
| JP | 2006-106605 A | 4/2006 |
| JP | 2008-225122 A | 9/2008 |
| JP | 2008-268323 A | 11/2008 |
| JP | 2011-085693 A | 4/2011 |
| JP | 2013-246379 A | 12/2013 |
| WO | 200963803 A1 | 5/2009 |

OTHER PUBLICATIONS

Extended European Search Report dated Apr. 21, 2017, including the Supplementary European Search Report and the European Search Opinion, in connection with corresponding EP Application No. 14893753.5 (9 pgs.).

* cited by examiner

4 BLOCKS    DUTY RATIO 20%

5 BLOCKS    DUTY RATIO 20%

FIG.5A PATTERN A

FIG.5B PATTERN B

FIG.5C PATTERN C

FIG.5D PATTERN D

FIG.5E PATTERN E

FIG.5F PATTERN F

FIG.5G PATTERN G

FIG.5H PATTERN H

FIG.5I PATTERN I

FIG.5J PATTERN J

FIG.5K PATTERN K

FIG.5L PATTERN L

LIQUID CRYSTAL DISPLAY DEVICE

TECHNICAL FIELD

The present invention relates to a liquid crystal display device.

BACKGROUND ART

Typically, the luminance of a liquid crystal display device is controlled by changing the intensity of light outputted from a backlight. The intensity of the output light from the backlight is generally controlled by changing the duty ratio for turning on or off the current passing through the backlight. Such a control method is commonly called PWM dimming. PWM dimming has an advantage that it can be realized using a simple circuit configuration. On the other hand, PWM dimming has a disadvantage that so-called flicker, where the screen flickers, occurs due to the turn-on/off of the backlight, particularly, when the duty ratio is low.

To compensate for this disadvantage, Patent Literature 1 performs so-called phase-shift control, that is, divides a backlight into five backlight blocks and sequentially turns on the backlight blocks while shifting the turn-on start timing. Thus, flicker can be reduced compared to when all the backlight blocks are turned on or off simultaneously.

CITATION LIST

Patent Literature

[Patent Literature 1] Japanese Unexamined Patent Application Publication No. 2008-225122

SUMMARY OF INVENTION

Technical Problem

However, even when the phase-shift control disclosed in Patent Literature 1 is performed, some degree of flicker remains, causing eyestrain.

The present invention has been made in view of the foregoing, an object thereof is to provide a liquid crystal display device that can further reduce flicker and, in particular, a liquid crystal display device that produces higher flicker reduction effects in a low-luminance region [specifically, a region in which backlight blocks turn on one by one separately (for four blocks, a region having a duty ratio of less than 25%)].

Solution to Problem

The present invention provides a liquid crystal display device including a control unit configured to control luminance of a backlight using PWM dimming. The backlight includes n (n≥4) number of backlight blocks configured to be turned on at different timings, and the n number of backlight blocks are turned on in an order different from the order in which the backlight blocks are physically arranged.

Conventional phase-shift control involves sequentially turning on linearly arranged multiple backlight blocks in the arrangement order. To consider a flicker reduction measure, the present inventors conducted an experiment for knowing how flicker changed when changing the order in which the backlight blocks were turned on. The experiment showed surprising results, that is, the worst result was shown when the backlight blocks were turned on in the arrangement order thereof, whereas flicker was reduced whenever the backlight blocks were turned on in any of orders other than the arrangement order. Then, the present inventor completed the invention.

Various embodiments of the present invention are described below. The embodiments below can be combined with each other.

Preferably, the n number backlight blocks are turned on in an order such that backlight blocks at both edges are not turned on continuously.

Preferably, the n number of backlight blocks are turned on in an order such that adjacent backlight blocks other than the backlight blocks at both edges are not turned on continuously.

Preferably, n is equal to or greater than 5, and the n number of backlight blocks are turned on in an order such that adjacent backlight blocks are not turned on continuously.

Preferably, the n number backlight blocks includes blocks A, B, C, and D which are arranged in this order, and the blocks A, B, C, and D are turned on in the order of A->B->D->C or A->C->D->B.

Preferably, the n number of backlight blocks includes blocks A, B, C, D, and E which are arranged in this order, and the blocks A, B, C, D, and E are turned on in the order of A->C->E->B->D, A->D->B->E->C, A->B->D->E->C, or A->C->E->D->B.

Preferably, the control unit controls the luminance of the backlight using only DC dimming in a high-luminance region and controls the luminance of the backlight using a combination of DC dimming and PWM dimming in a low-luminance region for which a lower luminance setting than a luminance setting for the high-luminance region is set.

BRIEF DESCRIPTION OF THE DRAWINGS

FIGS. 2A and 2B include diagrams showing the configuration of a backlight of the liquid crystal display device of the one embodiment of the present invention, in which

DETAILED DESCRIPTION

Now, an embodiment of the present invention will be described. Various features described in the embodiment below can be combined with each other.

Figure 1:
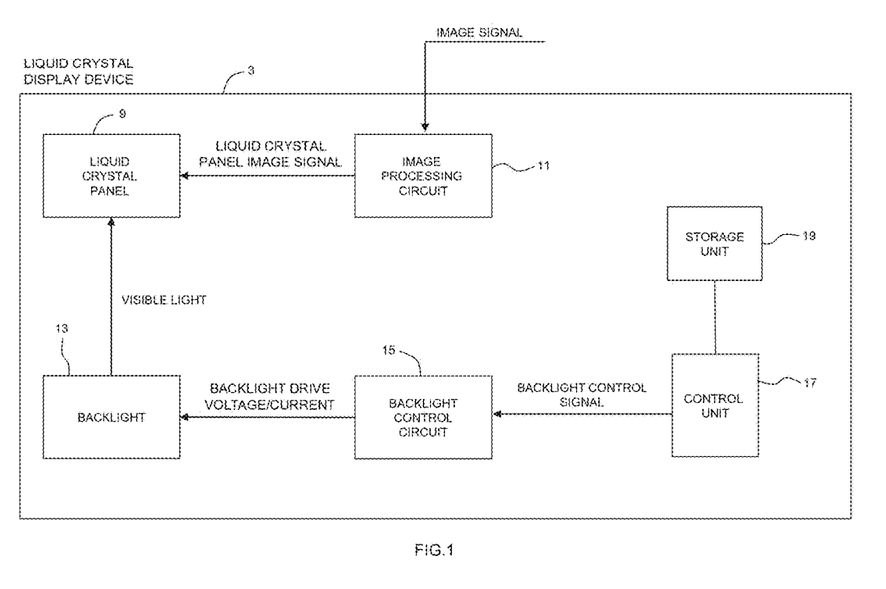
FIG. 1 is a block diagram showing the configuration of a liquid crystal display device of one embodiment of the present invention.

Referring to FIG. 1, a liquid crystal display device 3 of one embodiment of the present invention will be described. The liquid crystal display device 3 includes a liquid crystal panel 9, an image processing circuit 11, a backlight 13, a backlight control circuit 15, a control unit 17, and a storage unit 19.

The image processing circuit 11 converts an image signal received from outside into a signal most suitable for the liquid crystal panel 9 and outputs the resulting signal as a liquid crystal panel image signal. The backlight control circuit 15 applies a backlight drive voltage to the backlight 13 and outputs a current to be passed through the backlight 13, in accordance with a backlight control signal received from the control unit 17. In PWM dimming, a backlight control signal is a signal that controls the duty ratio for turning on or off the current passing through the backlight 13. In a combination of DC dimming and PWM dimming, a backlight control signal is a signal that controls the duty ratio and the amount of a current to be passed through the backlight 13. The backlight 13 is driven by the backlight drive current outputted from the backlight control circuit 15 and thus outputs visible light. The user can adjust the luminance of the backlight 13 by operating a luminance setting operation unit (not shown) to set a luminance setting and then causing the backlight control circuit 15 to adjust the output current in accordance with the luminance setting. The liquid crystal panel 9 displays an image on the basis of the liquid crystal panel image signal received from the image processing circuit 11 and the visible light outputted by the backlight 13. The control unit 17 includes a CPU and memories. The operation of the control unit 17 is stored in the storage unit 19 in the form of a program, and processing of the present embodiment is performed when the CPU reads and executes this program.

The backlight 13 may be of any type, and advantageous effects of the present invention can be obtained whether it is of fluorescent tube type or of LED type. However, the present invention is more suitably applied to an LED backlight 13, since a LED backlight has a short persistence time and therefore is more likely to cause conspicuous flicker. The present invention is also suitably applied to an edge-lit backlight 13, where light sources are disposed at an edge. Hereafter, an edge-lit liquid crystal display device 3 where LEDs are disposed at an edge of the display screen will be described as an example.

Figure 2A:
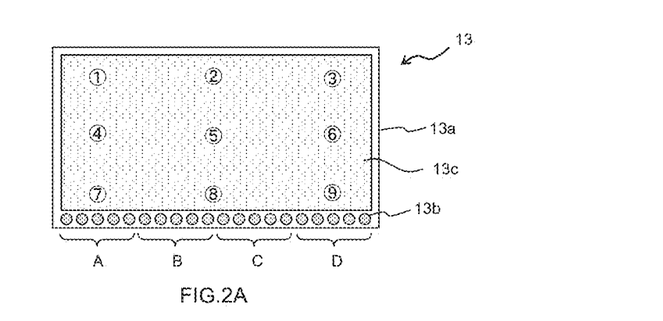
FIG. 2A shows a 4-block backlight.
Figure 2B:
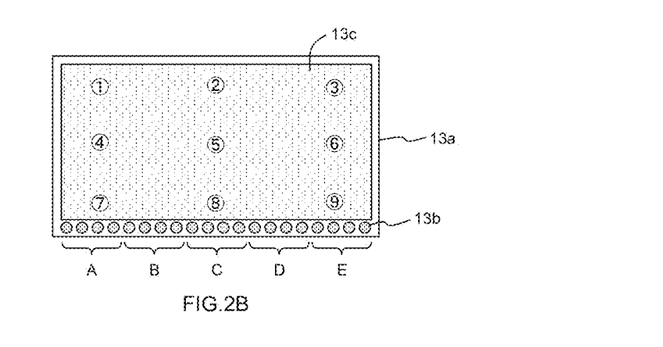
FIG. 2B shows a 5-block backlight.

As shown in FIGS. 2A and 2B, the backlight 13 includes many LEDs 13b arranged in line on a base 13a and a light guide 13c disposed so as to be adjacent to the LEDs 13b. The light guide 13c is disposed in a position corresponding to the display screen of the liquid crystal display device 3, and light from the LEDs 13b is spread over the display screen by the light guide 13c.

Figure 3A:
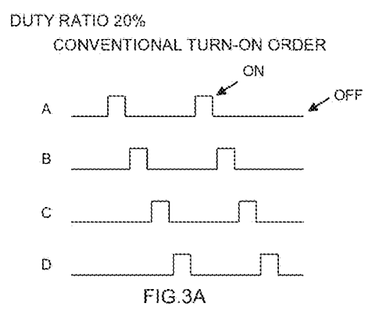
FIGS. 3A-3D are timing charts showing the turn-on timings of backlight blocks of the 4-block backlight.

When the backlight 13 is divided into four blocks, A, B, C, and D, as shown in FIG. 2A, the blocks A, B, C, and D are turned on at different timings, as shown in FIGS. 3A-3D. Conventionally, the blocks A, B, C, and D are turned on in the same order as the physical arrangement order thereof, that is, in the order of A->B->C->D, as shown in FIG. 3A. FIG. 3A shows an example in which the duty ratio is 20%. Accordingly, each block is on for a time (a time shown by ON in the diagram) corresponding to 20% of a cycle and is off for the remaining time (a time shown by OFF in the diagram). In the case of the 4-block backlight 13, the time from when one block is turned on to when a subsequent block is turned on is ¼ of a cycle (a time corresponding to 25% of a cycle). Accordingly, in an example shown in FIG. 3A, any block is not on for a time from when one block is turned off to when a subsequent block is turned on, which is a time corresponding to 5% of a cycle. Accordingly, in conventional turn-on control shown in FIG. 3A, any one of the blocks is on for a time corresponding to 80% of a cycle, although the duty ratio is 20%. With regard to an off-time corresponding to a total of 20% of a cycle, four off-times (5%) occur separately after each block is turned on and thus flicker is suppressed.

Figure 3B:
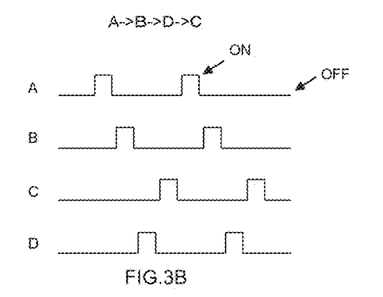
Figure 3C:
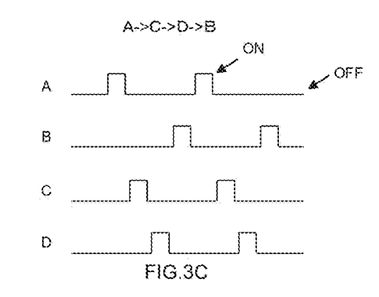
Figure 3D:
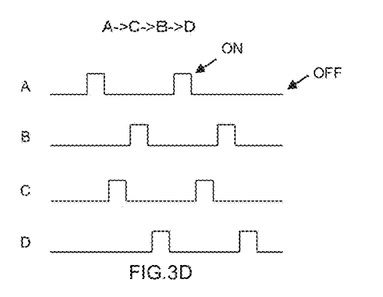
Figure 4A:
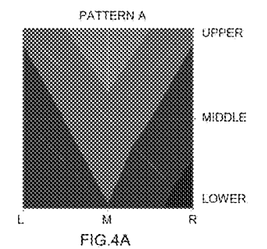
FIGS. 4A-4F include diagrams showing the distribution of flicker measurement values when the 4-block backlight is driven at a duty ratio of 20%, in which FIGS. 4A-4F correspond to patterns a to f, respectively.
Figure 4B:
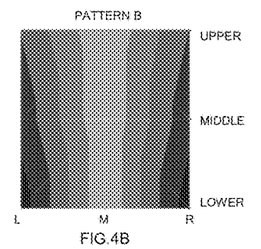
Figure 4C:
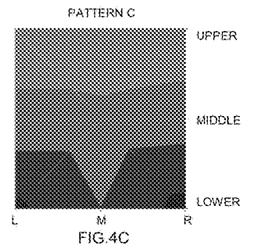
Figure 4D:
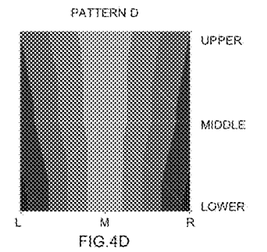
Figure 4E:
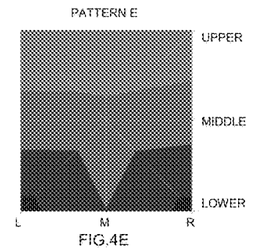
Figure 4F:
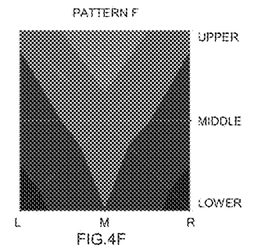
Figure 5A:
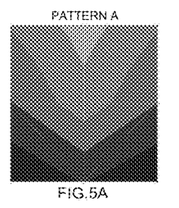
FIGS. 5A-5L include diagrams showing the distribution of flicker measurement values when the 5-block backlight is driven at a duty ratio of 20%, in which FIGS. 5A-5L correspond to patterns a to l, respectively.
Figure 5B:
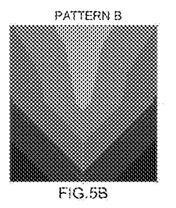
Figure 5C:
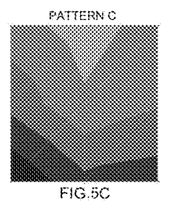
Figure 5D:
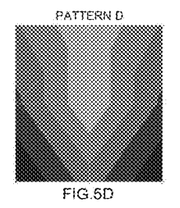
Figure 5E:
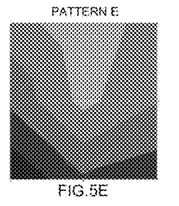
Figure 5F:
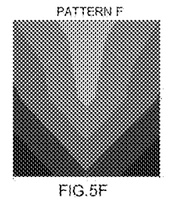
Figure 5G:
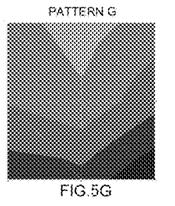
Figure 5H:
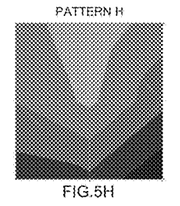
Figure 5I:
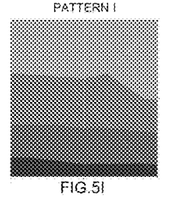
Figure 5J:
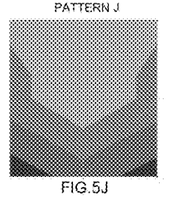
Figure 5K:
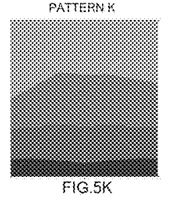
Figure 5L:
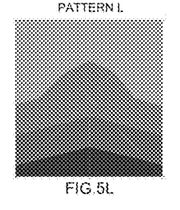

In the present embodiment, as shown in FIGS. 3B-3D, flicker is further suppressed by controlling the order in which the blocks A, B, C, and D are turned on. Specifically, the blocks A, B, C, and D are turned on in orders other than the order of A->B->C->D, as shown in FIGS. 3B-3D. In all these cases, flicker is further suppressed compared to when the blocks are turned on in the order of A->B->C->D. These cases will be demonstrated in Example later. Further, when the backlight blocks are turned on in an order such that the blocks A and D at both edges are not turned on continuously, as shown in FIGS. 3B and 3C, flicker is further suppressed compared to when the blocks at both edges are turned on continuously, as shown in FIG. 3D.

Even when the backlight 13 is divided into 5 blocks A, B, C, D, and E, as shown in FIG. 2B, when the blocks A, B, C, D, and E are turned on in an order other than the order in which the five blocks, A, B, C, D, and E, are arranged, that is, in an order other than the order of A->B->C->D->E, as in the four blocks, flicker is further suppressed compared to when the blocks are turned on in the order of A->B->C->D->E. Also, as in the four blocks, by turning on the five blocks in an order such that the backlight blocks at both ends are not turned on continuously, flicker is further suppressed. Moreover, by turning on the backlight blocks in an order such that adjacent backlight blocks other than the blocks at both ends are not turned on continuously, flicker is particularly suppressed. More specifically, the backlight blocks other than those at both ends are the blocks B, C, and D and therefore it is preferable that the turn-on order not include any of the orders of B->C, C->B, C->D, and D->C. Examples of such a turn-on order include A->C->E->B->D, A->D->B->E->C, A->B->D->E->C, and A->C->E->D->B. Further, by turning on the backlight blocks in an order such that adjacent backlight blocks are not turned on continuously, flicker is particularly suppressed. That is, it is preferred to turn on the backlight blocks in a turn-on order that does not include any of the orders of A->B, B->A, D->E, and E->D. Examples of such a turn-on order include A->C->E->B->D and A->D->B->E->C.

As seen above, when the backlight 13 includes n (n≥4) number of backlight blocks that are turned on at different timings, flicker is suppressed by turning the n number of backlight blocks in an order different from the physical arrangement order thereof; flicker is further suppressed by turning the backlight blocks in an order such that the backlight blocks at both edges are not turned on continuously; flicker is further suppressed by turning the n number of backlight blocks in an order such that adjacent backlight blocks other than backlight blocks at both edges are not turned on continuously; and flicker is further suppressed by turning on the n number of backlight blocks in an order such that adjacent backlight blocks are not turned on continuously.

The duty ratio of PWM dimming of the present embodiment is not limited to a particular duty ratio. However, flicker tends to become conspicuous as the duty ratio is reduced. For this reason, the present embodiment produces more remarkable advantageous effects as the duty ratio is reduced. In particular, when there is a moment at which all the blocks are turned off simultaneously (when the blocks of the backlight turn on one by one separately), flicker tends to become more conspicuous. In this case, the present embodiment produces particularly remarkable advantageous effects. Specifically, when the backlight 13 includes n (n≥4)

number of backlight blocks and when the duty ratio is less than 100/n(%) (less than 25% for four blocks; less than 20% for five blocks), preferably less than (100/n)×0.8(%), the PWM dimming of the present embodiment is suitably applied.

The frequency of PWM dimming is not limited to a particular frequency. The frequency is, for example, 100 to 1000 Hz, preferably 200 to 1000 Hz, more preferably 200 to 500 Hz. When the frequency is too low, flicker is more likely to become conspicuous even when the present embodiment is applied; when the frequency is too high, the minimum duty of PWM is limited, making it difficult to darken the screen.

In DC dimming, where the luminance is controlled by changing the amount of current supplied to the backlight 13, flicker does not occur on principle. Accordingly, DC dimming is preferred to PWM dimming in terms of flicker suppression. However, although the relationship between the amount of current supplied to the backlight 13 and the intensity of light outputted from the backlight 13 is stable while a large amount of current is supplied, it becomes less stable as the amount of current supplied is reduced. Also, there are cases in which chromaticity varies with reductions in the amount of current supplied and the backlight deviates from white to some extent (the backlight must always be while). This tendency is remarkable when the backlight 13 is of LED type.

In order to suppress the above disadvantages of DC dimming and to utilize advantages thereof, the control unit 17 is preferably configured to control the luminance of the backlight 13 using DC dimming in a high-luminance region, to control the luminance of the backlight 13 using a combination of DC dimming and PWM dimming in a low-luminance region for which a lower luminance setting than that for the high-luminance region is set, and to turn on the backlight blocks in the turn-on order of the present embodiment when performing PWM dimming. For example, assume that the threshold between the high-luminance region and low-luminance region is 20%. When the luminance setting is 30%, the luminance of the backlight 13 is controlled using only DC dimming. On the other hand, when the luminance setting is 10%, for example, the output of the backlight 13 is reduced to ⅕ using DC dimming, and the reduced output of the backlight 13 is further reduced to ½ by increasing the duty ratio to 50% using PWM dimming. Thus, a luminance according to the luminance setting is achieved. As seen above, by combining DC dimming and PWM dimming that uses the present embodiment, a relatively high PWM dimming duty ratio can be obtained even when the luminance setting is low. Even when the duty ratio must be reduced, flicker is further suppressed, since flicker reduction effects at a duty ratio of less than 100/n(%) are particularly high.

EXAMPLE

1. Flicker Measurement Experiment (Four Blocks)

Blocks A, B, C, and D of a 4-block backlight 13 as shown in FIG. 2A were turned on in turn-on orders represented by patterns a to f shown in Table 1, and flicker was measured at measurements points 1 to 9 in FIG. 2A. The measurement points 1 to 9 are intersection points on an upper-left portion 1, an upper-center portion 2, an upper-right portion 3, a left-center portion 4, a center portion 5, a right-center portion 6, a lower-left portion 7, a lower-center portion 8, and a lower-right portion 9, respectively, obtained by vertically and horizontally dividing the display screen into 9 equal portions. Flicker was measured using a luminance/flicker meter (model CA-210 available from Konica Minolta, Inc.) and a flicker measurement probe (model CA-P12 available from Konica Minolta, Inc.). The PWM dimming frequency was set to 100 Hz. The temperature and humidity were set to room temperature and room humidity. The measurements were made in a normal office environment, not in a darkroom.

For patterns a and f, the turn-on orders were the same as the physical arrangement orders of the blocks and therefore o is set in "turn on in arrangement order" fields thereof. For patterns a, c, e, and f, the blocks were continuously turned on in the order of A->D or D->A and therefore o is set in "continuously turn on both edges" fields thereof. For patterns a, c, e, and f, the blocks were continuously turned on in the order of B->C or C->B and therefore o is set in "continuously turn on adjacent blocks other than both edges" fields thereof.

TABLE 1

| | | Turn-on Order for 4 Blocks | | |
|---|---|---|---|---|
| Patten | Turn-on Order | Turn on in Arrangemen Order | Continuously Turn on Both Edges | Continuously Turn on Adjacent Blocks Other Than Both Edges |
| a | A->B->C->D->A-> ... | o | o | o |
| b | A->B->D->C->A-> ... | | | |
| c | A->C->B->D->A-> ... | | o | o |
| d | A->C->D->B->A-> ... | | | |
| e | A->D->B->C->A-> ... | | o | o |
| f | A->D->C->B->A-> ... | o | o | o |

The results of flicker measurement are shown in Tables 2 to 4. Tables 2 to 4 show the maximum values displayed on the luminance/flicker meter when the duty ratio was 80%, 50%, and 20%, respectively. An illustration of the contents of Table 4 is shown in FIGS. 4A-4F. In Tables 2 to 4, AVE represents the average of the measurement values at the 9 points; MIN represents the minimum of the measurement values at the 9 points; and ΔAVE and ΔMIN represent values relative to the AVE value and MIN value, respectively, in pattern a. Pattern a represents a turn-on order that is the same order as the physical arrangement order of the backlight blocks. This is a conventional turn-on order. Accordingly, ΔAVE and ΔMIN represent flicker reduction effects obtained by changing the turn-on order.

As shown in Tables 2 to 4, the AVE values in patterns a, f were greater than those in the other patterns at any of the duty ratios of 80%, 50%, and 20%. While the AVE value did not significantly vary among patterns b, c, d, and e, the MIN values in patterns b, d were much smaller than those in patterns c, e. These results reveal that flicker was suppressed by turning on the blocks in an order other than the physical arrangement order thereof and that flicker was further suppressed by turning on the blocks in an order such that the blocks at both edges were not turned on continuously. FIGS. 4A-4F show that portions having lighter colors had higher flicker measurement values. With regard to patterns b, d, portions around the central portion showed particularly light colors, indicating that flicker was greatly reduced in the central portion of the screen, by whose flicker the user is more likely to be annoyed.

Also, the AVE and MIN values in Tables 2 to 4 indicate that flicker tended to increase as the duty ratio decreased. Also, the ΔAVE and ΔMIN values in Tables 2 to 4 indicate that ΔAVE and ΔMIN took larger negative values as the duty ratio decreased. These results reveal that the present invention produced higher flicker suppression effects as the duty ratio decreased. In particular, when the duty ratio was 20%, AVE and MIN in pattern a took very large values, and ΔAVE and ΔMIN in patterns b to e took very large negative values, since the backlight blocks were turned on one by one at the duty ratio of 20%. These results reveal that the use of patterns b to e significantly suppressed flicker.

TABLE 2

| Duty Ratio 80% | | a | b | c | d | e | f |
|---|---|---|---|---|---|---|---|
| Measurement Point | ① | 3.80 | 3.9 | 1.8 | 3.9 | 1.8 | 3.7 |
| | ② | 1.50 | 0.1 | 1.4 | 0.1 | 1.4 | 1.4 |
| | ③ | 3.70 | 3.9 | 1.8 | 3.8 | 1.8 | 3.7 |
| | ④ | 4.60 | 4.7 | 3.1 | 4.6 | 3.1 | 4.5 |
| | ⑤ | 3.10 | 0.1 | 3 | 0.2 | 3 | 3.1 |
| | ⑥ | 4.60 | 4.8 | 3.3 | 4.6 | 3.3 | 4.6 |
| | ⑦ | 5.80 | 5.8 | 5.5 | 5.8 | 5.5 | 5.7 |
| | ⑧ | 3.90 | 0.2 | 3.9 | 0.2 | 3.8 | 3.8 |
| | ⑨ | 5.70 | 5.8 | 5.5 | 5.7 | 5.5 | 5.7 |
| AVE | | 4.08 | 3.26 | 3.26 | 3.21 | 3.24 | 4.02 |
| MIN | | 1.50 | 0.10 | 1.40 | 0.10 | 1.40 | 1.40 |
| Δ AVE | | 0.00 | −0.82 | −0.82 | −0.87 | −0.83 | −0.06 |
| Δ MIN | | 0.00 | −1.40 | −0.10 | −1.40 | −0.10 | −0.10 |

TABLE 3

| Duty Ratio 50% | | a | b | c | d | e | f |
|---|---|---|---|---|---|---|---|
| Measurement Point | ① | 9.9 | 10.3 | 4.6 | 10.3 | 4.4 | 9.9 |
| | ② | 3.9 | 0.3 | 3.8 | 0.2 | 3.8 | 3.8 |
| | ③ | 9.9 | 10.4 | 4.7 | 10.3 | 4.6 | 9.9 |
| | ④ | 12.2 | 12.5 | 8 | 12.4 | 8.2 | 12.2 |
| | ⑤ | 8.2 | 0.1 | 8.1 | 0.2 | 8.2 | 8.3 |
| | ⑥ | 12.4 | 12.8 | 8.7 | 12.4 | 8.8 | 12.2 |
| | ⑦ | 15.4 | 15.6 | 14.7 | 15.4 | 14.8 | 15.4 |
| | ⑧ | 10.4 | 0.2 | 10.4 | 0.2 | 10.4 | 10.4 |
| | ⑨ | 15.5 | 15.7 | 14.9 | 15.5 | 14.8 | 15.5 |
| AVE | | 10.87 | 8.66 | 8.66 | 8.54 | 8.67 | 10.84 |
| MIN | | 3.90 | 0.10 | 3.80 | 0.20 | 3.80 | 3.80 |

TABLE 3-continued

| Duty Ratio 50% | a | b | c | d | e | f |
|---|---|---|---|---|---|---|
| Δ AVE | 0.00 | −2.21 | −2.21 | −2.32 | −2.20 | −0.02 |
| Δ MIN | 0.00 | −3.80 | −0.10 | −3.70 | −0.10 | −0.10 |

TABLE 4

| Duty Ratio 20% | | a | b | c | d | e | f |
|---|---|---|---|---|---|---|---|
| Measurement Point | ① | 14.4 | 14.8 | 6.6 | 14.9 | 6.5 | 14.3 |
| | ② | 5.7 | 0.4 | 5.4 | 0.3 | 5.5 | 5.6 |
| | ③ | 14.4 | 15.2 | 6.8 | 15 | 6.6 | 14.3 |
| | ④ | 17.8 | 18.2 | 11.7 | 17.8 | 11.8 | 17.7 |
| | ⑤ | 11.9 | 0.4 | 11.6 | 0.5 | 11.7 | 12.1 |
| | ⑥ | 18 | 18.6 | 12.5 | 17.9 | 12.7 | 17.5 |
| | ⑦ | 19.3 | 22.7 | 21 | 22.1 | 21.6 | 22.4 |
| | ⑧ | 15.2 | 0.7 | 15.1 | 0.6 | 15.1 | 15.1 |
| | ⑨ | 22.5 | 22.9 | 21.7 | 22.1 | 21.5 | 22.5 |
| AVE | | 15.47 | 12.66 | 12.49 | 12.36 | 12.56 | 15.72 |
| MIN | | 5.70 | 0.40 | 5.40 | 0.30 | 5.50 | 5.60 |
| Δ AVE | | 0.00 | −2.81 | −2.98 | −3.11 | −2.91 | 0.26 |
| Δ MIN | | 0.00 | −5.30 | −0.30 | −5.40 | −0.20 | −0.10 |

2. Flicker Measurement Experiment (Five Blocks)

Blocks A, B, C, D, and F of a 5-block backlight 13 as shown in FIG. 2B were turned on in turn-on orders represented by patterns a to l shown in Table 5, and flicker was measured at measurements points 1 to 9 in FIG. 2B. Measurement points 1 to 9 are points in positions similar to those in FIG. 2A. The flicker measurement conditions were similar to those of the four blocks.

For example, the turn-on order of "A->E->D->C->B->A" does not appear among patterns a to l. The reason is: "A->E->D->C->B->A" is equivalent to "E->D->C->B->A->E"; and when the five blocks are named as A, B, C, D, and E sequentially from the right, this turn-on order becomes "A->B->C->D->E->A" and is the same as pattern a. Since whether the five blocks are named sequentially from the right or from the left has no influence on the results, patterns reverse to patterns a to l, such as "A->E->D->C->B->A", are excluded from Table 5 to simplify evaluations.

For pattern a, the turn-on order was the same as the physical arrangement order of the blocks and therefore ○ is set in a "turn on in arrangement order" field thereof. For patterns a, c, g, i, k, and l, the blocks were continuously turned on in the order of A->E or E->A and therefore ○ is set in "continuously turn on both edges" fields thereof. For the patterns other than patterns d, j, the turn-on orders each include the order of B->C, C->B, C->D, or D->C and therefore ○ is set in "continuously turn on adjacent blocks other than both edges" fields thereof. For pattern d, the turn-on order includes the orders of A->B and D->E and therefore ○ is set in a "continuously turn on adjacent blocks" field thereof.

TABLE 5

| | | Turn-on Order for 5 Blocks | | | |
|---|---|---|---|---|---|
| Patten | Turn-on Order | Turn on in Arrangemen Order | Continuously Turn on Both Edges | Continuously Turn on Adjacent Blocks Other Than Both Edges | Continuously Turn on Adjacent Blocks |
| a | A->B->C->D->E->A-> . . . | ○ | ○ | ○ | ○ |
| b | A->B->C->E->D->A-> . . . | | | ○ | ○ |

TABLE 5-continued

Turn-on Order for 5 Blocks

| Patten | Turn-on Order | Turn on in Arrangemen Order | Continuously Turn on Both Edges | Continuously Turn on Adjacent Blocks Other Than Both Edges | Continuously Turn on Adjacent Blocks |
|---|---|---|---|---|---|
| c | A->B->D->C->E->A-> . . . |  | ○ | ○ | ○ |
| d | A->B->D->E->C->A-> . . . |  |  |  | ○ |
| e | A->B->E->C->D->A-> . . . |  |  | ○ | ○ |
| f | A->B->E->D->C->A-> . . . |  |  | ○ | ○ |
| g | A->C->B->D->E->A-> . . . |  | ○ | ○ | ○ |
| h | A->C->B->E->D->A-> . . . |  |  | ○ | ○ |
| i | A->C->D->B->E->A-> . . . |  | ○ | ○ | ○ |
| j | A->C->E->B->D->A-> . . . |  |  |  |  |
| k | A->D->B->C->E->A-> . . . |  | ○ | ○ | ○ |
| l | A->D->C->B->E->A-> . . . |  | ○ | ○ | ○ |

The flicker measurement results at a duty ratio of 20% are shown in Table 6. An illustration of the contents of Table 6 is shown in FIGS. 5A-5L. The vertical and horizontal directions in drawings included in FIGS. 5A-5L are similar to those in FIGS. 4A-4F. The meanings of AVE, MIN, ΔAVE, and ΔMIN in Table 6 are similar to those of the four blocks.

As shown in Table 6, for pattern a, which represents "turn on in arrangement order, the AVE value was greater than those of the other patterns. This result reveals that flicker can be suppressed by avoiding the turn-on of the five blocks in the physical arrangement order thereof. For patterns c, g, i, and k, which represent "continuously turn on both edges," the MIN values were greater than those of the other patterns. For pattern l, which represent "continuously turn on both edges," a very large flicker value was measured in the central portion of the screen, in which flicker can be most conspicuous. These results reveal that flicker can be suppressed by avoiding the continuous turn-on of the blocks at both edges. For patterns d, j, the MIN values were very small, since the adjacent blocks B, C, and D other than the blocks at both edges were avoided from being turned on continuously. For pattern j, the MIN value was particularly small, since the adjacent blocks were avoided from being turned on continuously. FIGS. 5A-5L show that portions having lighter colors had lower flicker measurement values. For patterns d, j, lighter colors were shown particularly around the central portion, indicating that flicker was significantly reduced in the central portion of the screen, by whose flicker the user is more likely to be annoyed.

The turn-on order of pattern d is reverse to "A->C->E->D->B", and the turn-on order of pattern j is reverse to "A->D->B->E->C". Accordingly, "A->C->E->D->B" is expected to suppress flicker as does pattern d, and "A->D->B->E->C" is expected to suppress flicker as does pattern j.

TABLE 6

| Duty Ratio 20% | Pattern | | | | | | | | | | | |
|---|---|---|---|---|---|---|---|---|---|---|---|---|
| | a | b | c | d | e | f | g | h | i | j | k | l |
| Measurement Point ① | 9.8 | 10.3 | 7.4 | 10.6 | 7.6 | 10.2 | 7.4 | 7.6 | 2.7 | 4.1 | 2.9 | 0.8 |
| ② | 2.7 | 1.4 | 2.5 | 0.5 | 1.4 | 1.4 | 2.4 | 1.3 | 2.4 | 0.5 | 2.4 | 2.7 |
| ③ | 9.7 | 10.1 | 7.4 | 10.5 | 7.6 | 10.2 | 7.4 | 7.6 | 3.1 | 4.2 | 2.6 | 0.9 |
| ④ | 15.4 | 15.6 | 13.4 | 16.2 | 13.8 | 16.1 | 9.6 | 9.8 | 6.1 | 6.9 | 5 | 4.1 |
| ⑤ | 7.2 | 3.9 | 5.9 | 0.4 | 3.6 | 3.6 | 6.1 | 4 | 5.9 | 0.3 | 6.1 | 7.1 |
| ⑥ | 15 | 15.7 | 9.5 | 16.1 | 9.8 | 15.5 | 13.2 | 13.6 | 4.8 | 6.8 | 5.6 | 3.8 |
| ⑦ | 25 | 24.9 | 24.9 | 25.5 | 24.9 | 25.4 | 18.3 | 17.9 | 17.9 | 18.4 | 17.8 | 16.8 |
| ⑧ | 19.7 | 16.4 | 16.4 | 12.6 | 15.8 | 15.8 | 17 | 16.3 | 16.7 | 12.6 | 17 | 19.7 |
| ⑨ | 24.9 | 25.2 | 17.7 | 25.3 | 18.1 | 24.8 | 24.7 | 24.6 | 16.8 | 17.5 | 17.7 | 16.9 |
| AVE | 14.38 | 13.72 | 11.68 | 13.08 | 11.40 | 13.67 | 11.79 | 11.41 | 8.49 | 7.92 | 8.57 | 8.09 |
| MIN | 2.70 | 1.40 | 2.50 | 0.40 | 1.40 | 1.40 | 2.40 | 1.30 | 2.40 | 0.30 | 2.40 | 0.80 |
| Δ AVE | 0.00 | −0.66 | −2.70 | −1.30 | −2.98 | −0.71 | −2.59 | −2.97 | −5.89 | −6.46 | −5.81 | −6.29 |
| Δ MIN | 0.00 | −1.30 | −0.20 | −2.30 | −1.30 | −1.30 | −0.30 | −1.40 | −0.30 | −2.40 | −0.30 | −1.90 |

The invention claimed is:

1. A liquid crystal display device comprising:
    a control unit configured to control luminance of a backlight using PWM dimming, wherein the backlight comprises n number of backlight blocks configured to be turned on at different timings, n being equal to or greater than 4;
    a duty ratio of the backlight is less than 25%; and
    the n number of backlight blocks are turned on in an order different from the order in which the backlight blocks are physically arranged and in an order in which backlight blocks at both edges are not turned on consecutively.

2. The liquid crystal display device of claim 1, wherein the n number of backlight blocks are turned on in an order such that adjacent backlight blocks other than the backlight blocks at both edges are not turned on consecutively.

3. The liquid crystal display device of claim 2, wherein n is equal to or greater than 5, and
    the n number of backlight blocks are turned on in an order such that adjacent backlight blocks are not turned on consecutively.

4. The liquid crystal display device of claim 3, wherein the n number of backlight blocks comprises blocks A, B, C, D, and E which are arranged in this order, and the blocks A, B, C, D, and E are turned on in the order of A ->C ->E ->B ->D, A ->D ->B ->E ->C, A ->B -> D ->E ->C, or A ->C ->E ->D ->B.

5. The liquid crystal display device of claim 3, wherein the control unit controls the luminance of the backlight using only DC dimming in a high-luminance region and controls the luminance of the backlight using a combination of DC dimming and PWM dimming in a low-luminance region for which a lower luminance setting than a luminance setting for the high-luminance region is set.

6. The liquid crystal display device of claim 2, wherein the n number of backlight blocks comprises blocks A, B, C, and D which are arranged in this order, and
the blocks A, B, C, and D are turned on in the order of A ->B ->D ->C or A ->C ->D ->B.

7. The liquid crystal display device of claim 2, wherein the n number of backlight blocks comprises blocks A, B, C, D, and E which are arranged in this order, and
the blocks A, B, C, D, and E are turned on in the order of A ->C ->E ->B ->D, A ->D ->B ->E ->C, A ->B -> D ->E ->C, or A ->C ->E ->D ->B.

8. The liquid crystal display device of claim 2, wherein the control unit controls the luminance of the backlight using only DC dimming in a high-luminance region and controls the luminance of the backlight using a combination of DC dimming and PWM dimming in a low-luminance region for which a lower luminance setting than a luminance setting for the high-luminance region is set.

9. The liquid crystal display device of claim 1, wherein the n number of backlight blocks comprises blocks A, B, C, and D which are arranged in this order, and
the blocks A, B, C, and D are turned on in the order of A ->B ->D ->C or A ->C ->D ->B.

10. The liquid crystal display device of claim 9, wherein the control unit controls the luminance of the backlight using only DC dimming in a high-luminance region and controls the luminance of the backlight using a combination of DC dimming and PWM dimming in a low-luminance region for which a lower luminance setting than a luminance setting for the high-luminance region is set.

11. The liquid crystal display device of claim 1, wherein the n number of backlight blocks comprises blocks A, B, C, D, and E which are arranged in this order, and
the blocks A, B, C, D, and E are turned on in the order of A ->C ->E ->B ->D, A ->D ->B ->E ->C, A ->B -> D ->E ->C, or A ->C ->E ->D ->B.

12. The liquid crystal display device of claim 11, wherein the control unit controls the luminance of the backlight using only DC dimming in a high-luminance region and controls the luminance of the backlight using a combination of DC dimming and PWM dimming in a low-luminance region for which a lower luminance setting than a luminance setting for the high-luminance region is set.

13. The liquid crystal display device of claim 1, wherein the control unit controls the luminance of the backlight using only DC dimming in a high-luminance region and controls the luminance of the backlight using a combination of DC dimming and PWM dimming in a low-luminance region for which a lower luminance setting than a luminance setting for the high-luminance region is set.

* * * * *